United States Patent [19]
Mahendran et al.

[11] Patent Number: 6,024,872
[45] Date of Patent: Feb. 15, 2000

[54] METHOD OF MAKING A DOPE COMPRISING HYDROPHILIZED PVDF AND α-ALUMINA, AND A MEMBRANE MADE THEREFROM

[75] Inventors: Mailvaganam Mahendran, Hamilton, Canada; Kenneth Paul Goodboy, Wexford, Pa.; Jinhua Bai, Burlington, Canada

[73] Assignee: Zenon Evironmental Inc., Burlington, Canada

[21] Appl. No.: 09/312,149

[22] Filed: May 14, 1999

Related U.S. Application Data

[62] Division of application No. 08/886,652, Jul. 1, 1997, Pat. No. 5,914,039.

[51] Int. Cl.⁷ ............................... B01D 39/00; C08F 8/00
[52] U.S. Cl. ................................ 210/500.25; 210/500.42; 525/326.3; 525/372
[58] Field of Search .............................. 525/326.2, 326.3, 525/372; 524/430, 545, 104, 437; 210/500.25, 500.26, 500.42

[56] References Cited

U.S. PATENT DOCUMENTS

| | | | |
|---|---|---|---|
| 3,893,971 | 7/1975 | Ukihashi et al. | 524/430 |
| 4,650,819 | 3/1987 | Nakamoto et al. | 523/223 |
| 4,957,943 | 9/1990 | McAllister et al. | 521/64 |
| 5,130,342 | 7/1992 | McAllister et al. | 521/61 |

FOREIGN PATENT DOCUMENTS 58-093734A  6/1983  Japan.

Primary Examiner—John Kim
Assistant Examiner—Richard W. Ward
Attorney, Agent, or Firm—Alfred D. Lobo

[57] ABSTRACT

A filtration membrane for micro- or ultra-filtration is formed from a complex of PVDF and calcined α-alumina ("α-Al") particles, in which complex the particles are reacted and dispersed. The suspended complex is then mixed with a hydrophilic polymer such as polyvinyl alcohol (40%–90% hydrolyzed) referred to herein as HPVA, which reacts with the complex imparting hydrophilicity to the polymer. The novel membrane provides about 50% higher specific flux than a membrane made with the same polymer but without the α-Al particles. Unexpectedly, the net flux is improved by treating the membrane with a solution of sodium hypochlorite which fails to remove the HPVA from the novel membrane but does remove it from the prior art membrane which does not contain the α-Al. The preferred membrane comprises a macroporous support coated on its outer surface with a thin tubular asymmetric semipermeable film of polymer containing less than about 50% by weight of α-Al particles.

5 Claims, 11 Drawing Sheets

METHOD OF MAKING A DOPE COMPRISING HYDROPHILIZED PVDF AND α-ALUMINA, AND A MEMBRANE MADE THEREFROM

This is a division of patent application Ser. No. 08/886,652 filed on Jul. 1, 1997, now U.S. Pat. No. 5,914,039.

BACKGROUND OF THE INVENTION

This invention relates to a microfiltration (MF) or ultrafiltration (UF) membrane of organic polymer for filtering a desired liquid from a liquid mass referred to herein as a "substrate".

The membrane may be in the form of a capillary tube or hollow fiber membrane (or "fiber" for brevity), or, in the form of a tubular sheath of film formed either on the inner or outer surface of a tubular macroporous support; or a laminar sheet or film; or a laminar sheet or film deposited on a porous support. In the art, a hollow fiber of microporous polymer, or, a tube of braid having a nominal inside diameter of less than 2.5 mm, coated with a semipermeable film of microporous polymer is referred to as a hollow fiber membrane. A hollow fiber membrane which does not require a support, by definition, is self-supporting. A tubular sheath of thin film of polymer, by itself, or a sheet of thin film, by itself, is non-self-supporting and must be supported. The term "membrane" is used to refer to a film or sheet or the hollow fiber membrane in its entirety, irrespective of the form in which it is deployed. A particular example of a hollow fiber membrane is an extruded hollow fiber membrane with an outer diameter in the range from about 0.25 mm to 2.5 mm and a wall thickness in the range from about 0.15 mm to 1 mm, typically being in the range from about 5% to about 40% of the outside diameter of the fiber. The average pore cross sectional diameter in a fiber may vary widely. For MF, the average pore diameter is in the range from about 0.08 μm to about 2.0 μm, preferably from about 0.1–1 μm. For UF, the average pore diameter is preferably in the range from about 0.01 μm to 0.1 μm. An example of a supported membrane is a flexible laminar sheet; or a tube of knitted or woven flexible braid coated with the tubular film, the tube having an outside diameter in the range from about 0.5 mm to about 5 mm. For the sake of clarity, reference to the film, by itself, is made with the term "film membrane", or "thin film" or "film" for brevity, since without the film there would be no membrane. Since the support for a film membrane has macropores which are very large relative to pores within the film, they are referred to herein as "voids".

A tubular sheath of non-supporting film has such a thin wall, in the range from 0.01 mm to 0.09 mm thick, that the tube will collapse unless supported by fluid. If a thin sheet of film 0.09 mm thick is either extruded or cast, a piece of the film in a small square 10 cm on each side, has so little strength that, by itself, it cannot be manually or mechanically manipulated without being damaged. Because of its very thin cross-section and non-self-supporting nature, such a film, derived from the synthetic resinous material provides a semipermeable film having excellent semipermeable properties so long as the film is suitably deployed, and, a geometry favored by the film, is maintained. The membrane may be operated as MF or UF under a vacuum drawn on the "lumens" (bores of the fibers) in the range from 1 mm (0.02 psi) to about 517 mm (10 psi) of Hg, and under an overall differential in hydrostatic pressure in the range from about atmospheric 101 kPa (14.7 psi) to 300 kPa (43.54 psi), preferably less than 275 kPa (40 psi) for MF flow; and, from about 300 kPa (43.54 psi) to about 690 kPa (100 psi), preferably less than 600 kPa (87 psi) for UF flow.

The art of forming either self-supporting hollow fibers, or a non-supporting thin film supported on a tubular braid is well known, given the specific polymer which has been found to lend itself to being formed with the physical structure required to function as a semipermeable membrane for filtration of a liquid.

Though numerous ultrafiltration membranes are available, the search to find a membrane with optimum properties is unremitting. The problem is to find a membrane which allows filtration of the desired liquid with a high flux which is maintained over a long period of operation. Knowing that a polymer can yield a semipermeable membrane having a gradient porosity therethrough, with requisite orientation, is insufficient information for one skilled in the art to make the membrane. For example, polyvinylidene difluoride (PVDF) in a specified range of molecular weights will yield a filtration membrane, however its long term performance will be poor due to fouling, and, to filter an aqueous substrate with desirable performance, should be made hydrophilic. Polypropylene will yield a filtration membrane only if it is oriented after it is cast in a particular range of thickness, and should be prepped, for example with alcohol, before using the membrane to filter an aqueous substrate. Knowing that polymer when cast or extruded will yield a microfiltration or ultrafiltration membrane, one skilled in the art must still know details relating to how the solution of polymer ("dope") is to be manipulated, if they are to prepare a membrane which is usable for a specified purpose.

The physical solution to the problem lay in finding a particular, highly stable polymer which lent itself to having its structure modified so as to produce a membrane with excellent flux and reliability in operation.

U.S. Pat. No. 5,130,342 to McAllister et al discloses particle-filled microporous materials in which substantially non-agglomerated inert filler particles are dispersed in a thermoplastic polymer. There is no evidence provided that a usable filtration membrane can be formed as disclosed, and no evidence that any membrane formed as disclosed was effective as a filter in any liquid substrate.

Japanese JP 58093734 A teaches that a hydrophilic PVDF membrane is produced by treating a membrane of PVDF, or copolymers of PVDF, containing a fine powder of hydrophilic inorganic particles, with an aqueous alkali. Silicic acid, calcium silicate, alumina and magnesium oxide are specified, and it is stated that use of these powders enables the wetting treatment of the membrane to be omitted. There is no suggestion that any specified powder or contents of the powder, which would react with the polymer and calcined α-alumina is not specified. Neutral alumina will not react with PVDF in a solvent in which neutral alumina is inert, and such particles substituted for calcined α-alumina particles are relatively ineffective. It is well known to treat a PVDF membrane (not PVDF polymer), first with base, then with acid, to improve its hydrophilicity. Preparing the complex, as we have, avoids the post-treatment of the membrane.

SUMMARY OF THE INVENTION

It has been discovered that an asymmetric semipermeable membrane may be formed from a polymeric film of polyvinylidene difluoride (PVDF) grafted with a hydrophilic polymer, the film supported on a macroporous support, in which film a minor amount by weight of calcined α-alumina particles (hereafter calcined α-alumina particles are referred to as "α-Al" for brevity), less that 50 percent by weight (% by wt) of the film, preferably less than 20% by wt, are dispersed. It is critical that the particles be α-Al which are basic (pH in the range from about 8 to about 10) and that they be added prior to grafting the hydrophilic polymer. Addition of more α-Al than specified produces a membrane unusable in filtering a liquid.

More specifically, when PVDF is dissolved in a suspension of α-Al particles, a reaction product (referred to herein as a "PVDF/α-Al complex") results. When this complex containing less than 50% by weight, based on the combined weight of α-Al and PVDF polymer, is reacted with a hydrophilic polymer in the presence of acid, a dope with appropriate viscosity is obtained; and, when this dope is formed into a semipermeable filtration membrane, the membrane unexpectedly (i) yields much higher flux than is obtained with the blend of PVDF and the hydrophilic component without the particles, and (ii) is resistant to rupture, yet (iii) may be formed with a smooth outer surface which is not easily fouled. Moreover, when a prior art membrane is made with PVDF blended with hydrolyzed polyvinyl acetate (hydrolyzed in the range from 40%–90%), but without α-Al particles in the membrane, the hydrophilic component may be removed from the membrane by treatment with aqueous sodium hypochlorite (NaOCl), other alkali metal hypochlorite and other oxidizing agents. The hydrophilicity of such a prior art membrane is thus greatly reduced and the flux decreased with time. In contrast, a membrane made with the complex, treated identically with aqueous NaOCl, retains the hydrolyzed vinyl acetate; and, unexpectedly, its flux is improved. The average diameter of pores of a preferred MF membrane may range from about 0.08 μm to 0.3 μm.

More specifically it has been discovered that when the complex is reacted with a polymer having hydrophilic groups which are grafted onto the base polymer, specifically PVDF, to yield a membrane, its flux is higher than that of a membrane made with the same grafted polymer without α-Al particles; and the surface smoothness (or mean roughness "Ra") of the novel membrane is better than that of the same membrane without the particles. The roughness was measured from Atomic Force Microscope (AFM) images of various samples, as set forth below. Smoother membranes are less prone to fouling by particulate matter adhering to it.

Further, it has been discovered that hydrophilicity is destroyed in a prior art PVDF/HPVA blend without α-Al particles when the membrane is treated with an aqueous alkali metal hypochlorite solution. In contrast, so long as the novel membrane contains the α-Al particles, the membrane may be treated with the same alkali metal hypochlorite solution and its flux is enhanced (relative to that obtained prior to treatment) without destroying the hydrophilicity of the polymer. Most preferred grafting copolymer is the aforementioned hydrolyzed polyvinyl acetate, referred to in the art as hydrolyzed polyvinyl alcohol (40%–90% hydrolyzed), and referred to herein as HPVA.

The method for making the preferred embodiment of the tubular filtration membrane supported on braid comprises, (a) introducing a flexible tubular braid into a coating nozzle, and into a rounding orifice therein, (b) dispersing α-Al particles in a solution of PVDF and adding a hydrophilic polymer in the presence of acid to yield a grafted polymer in a dope having a viscosity sufficient to provide a coating on a support, (c) extruding the dope on to the support at a rate sufficient to form a continuous layer of dope, (d) maintaining a longitudinal and axial tension on the braid sufficient to advance it through the nozzle, and (e) coagulating the dope to form a semipermeable film of polymer adherently secured to the tubular braid.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

The spatially symmetrical disposition of the hydrogen and fluorine atoms along the PVDF chain gives rise to properties which make PVDF unique among a large number of polymers which can be formed to provide a MF or UF membrane. Since it is well known that the stability of PVDF approaches the essentially inert attribute of fully fluorinated polymers, it is especially noteworthy that the addition of a powder of calcined α-alumina particles to a solution of PVDF in N-methyl-2-pyrrolidone ("NMP") changes the color of the solution from milky to yellowish brown, and then to purple (depending upon the relative concentrations of NMP, PVDF and calcined α-Al), indicating a reaction. Other polymers which may not be as well-suited for making a liquid filtration membrane as PVDF, are halohydrocarbons adapted to be dehydrohalogenated in a manner analogous to that described herein for PVDF.

The details of the reaction are not precisely known, but there is indirect and direct evidence to show that PVDF is dehydrofluorinated and/or crosslinks in the presence of calcined α-Al. In the second stage the hydrophilic polymer is grafted in situ onto the PVDF. The polymer is referred to as being grafted in situ because the grafting occurs before the membrane is formed. It is believed that the reactions proceed as illustrated in the scheme shown in FIG. 1.

Figure 1:
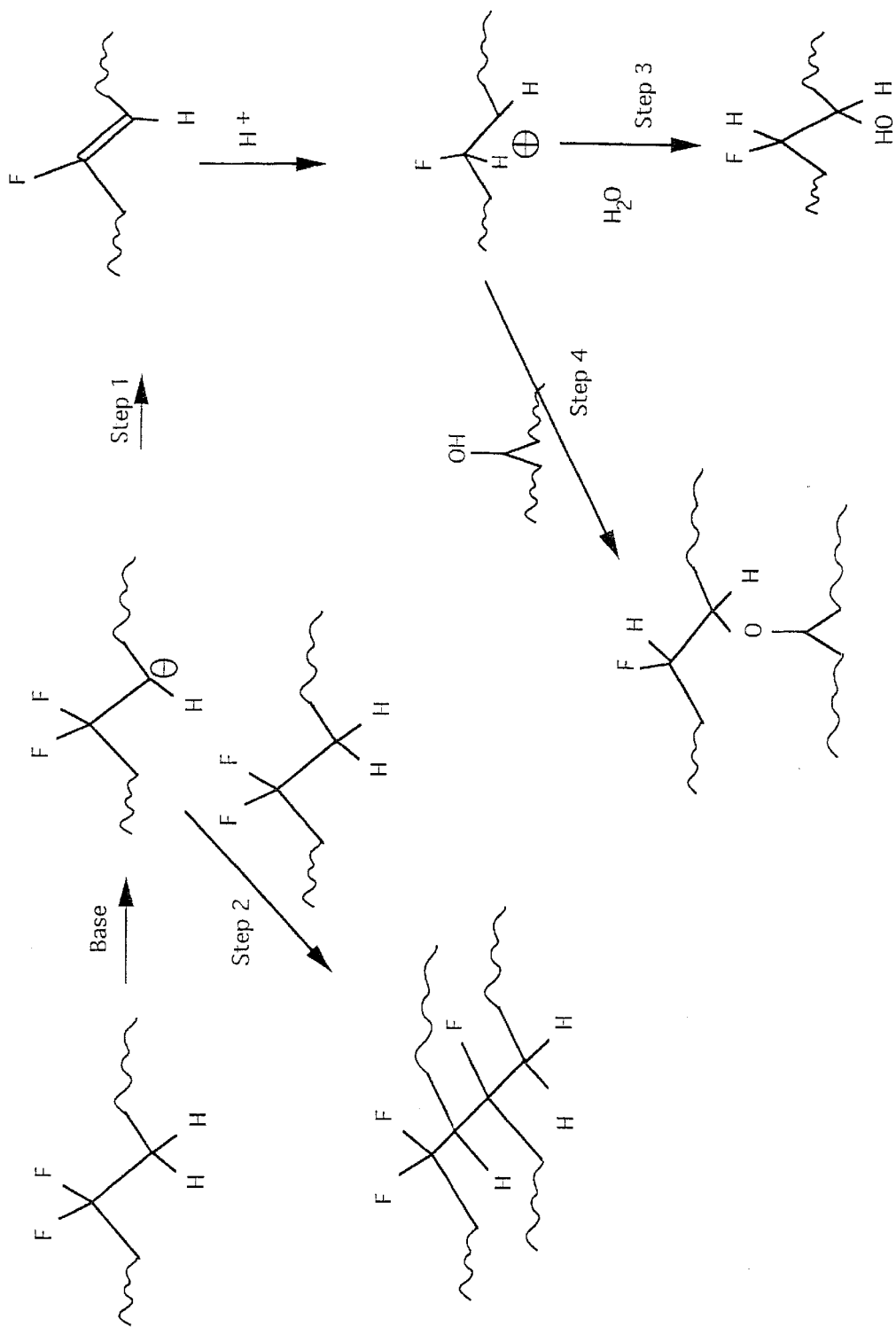
FIG. 1 illustrates a proposed scheme for reactions which result in formation of a polymer used to make the film of the membrane of this invention.

It is well known that PVDF loses hydrogen fluoride in the presence of a base (in the case at hand, base is furnished by calcined α-Al), which causes the polymer to become unsaturated (FIG. 1, step 1). If enough double bonds form, some are conjugated, evidenced by intense color of the complex. Concurrently the anion may displace or substitute F in an adjacent chain of polymer to crosslink it (step 2). This becomes evident when concentration of base is increased by adding an excess of base, namely calcined α-Al in an amount of 61% by weight, or more, of total solids in the polymer. A dope containing PVDF/α-Al/HPVA in the ratio 15/25/1 parts by wt, the remaining being NMP, is rubbery and does not form a usable membrane for filtration of a liquid. It is therefore critical to control the amount of α-Al in the complex.

In the second stage of dope making a hydrophilic polymer which contains hydroxyl groups, a strong aqueous acid like sulfuric acid is added. There are two reactions that can take place: (1) addition of water to the double bond to yield a hydroxylated polymer (step 3), or (2) addition of the hydroxyl group of the hydrophilic polymer to the double bond to yield an in situ grafted polymer (step 4). The addition reaction is catalyzed by acid, so it is essential that there be no base left after step 1 and step 2. Acidification of the unsaturated chain formed after step 1 generates a cation to which, in step 4, the hydrolyzed polymer is grafted, and/or in step 3, water reacts to give the hydroxylated polymer. It is therefore critical that the amount of α-Al be controlled. Evidence of such criticality is presented as follows: If the color does not change when the hydrophilic polymer with acid is added, an excess of base is indicated. This confirms that if, after addition of the hydrophilic polymer, the dope is not acidic, steps 3 and 4 which are critical, will not occur.

The solution to the problem of improving the flux of a prior art PVDF/HPVA membrane lay in finding that the membrane may be modified by addition of calcined α-Al particles prior to adding the HPVA. The size of the primary particles of calcined α-Al is preferably in the range from about 0.1 μm to 5 μm, preferably less than 2 μm, most preferably from about 0.2 μm to 1 mm. However, knowing that flux through a membrane (and flow of permeate) is maximized when the membrane is made as thin as possible, it is implicit that introducing solid particles in the membrane introduces much concern not only as to how the ability to form a usable membrane will be affected, but also (a) the effect of the particles on resistance of such a membrane to rupture, and (b) the susceptibility of its surface to fouling.

Unexpectedly, the addition of the calcined α-Al yields a rugged and reliable, but thin semipermeable film. Such a film may be coated on a macroporous support in a thickness less than 0.2 mm, preferably less than 0.1 mm thick. A hollow fiber membrane, so obtained is effective for water purification, filtration of a fermentation broth, and other MF and UF applications.

To determine the effect of α-Al alone, and the combination of α-Al and HPVA on the flux of the PVDF membranes, the pure water permeability, molecular weight cut-off (MWCO) and pore diameter of three membranes made from three different dopes PVDF/α-Al, PVDF/HPVA and PVDF/α-Al/HPVA were determined. The results are set forth in the following Table 1.

TABLE 1

| Membrane | Permeability GFD/psi | MWCO, % 200K, PEO | Pore Diameter μm |
| --- | --- | --- | --- |
| PVDF/α-Al | 8.6 | 93. | 0.078 |
| PVDF/HPVA | 13.0 | 85. | 0.085 |
| PVDF/α-Al/HPVA | 70.0 | 80. | 0.115 |

The results above provide clear evidence that the combination of the hydrophilic component (HPVA) and α-Al increases the flux obtained with α-Al alone by 8 times.

For purposes of the description of the best mode of making and using the invention, a tube of braid formed from a yarn of material insoluble in the dope, is most preferred. Other tubular supports with voids may also be used so long as the material from which such supports are formed, provides apt adherent properties for the film. The voids place the outside surface of the film in restricted fluid communication with the inside surface of the braid. Voids which are smaller than about 10 μm tend to interfere with the flux, and those larger than 100 μm tend to have the film penetrate the voids and hang too far down over the yarn forming the voids. Voids which are too large also negate the surprising strength of the film membrane. Instead of being woven as a tube, a fabric may be formed into a tube. Whether the fabric is knitted, braided, woven, non-woven or simply perforated, it may be used, since in each case, such a tube provides a foraminous tubular support with the desired voids or macropores. Netting or mesh fabric such as is known in the trade as cubicle netting 22/1000 made by Frankel Associates of New York, N.Y. of 210 denier nylon, warp-knitted by the Raschel knitting process, such as is used in the '982 membrane may be used, provided the voids are not too large, as specified herebelow for MF or UF use. In an analogous manner, a macroporous sheet may be used to support the membrane.

The number average molecular weight of PVDF from which the film membrane is formed is preferably lower than $10^6$ (1,000,000), more preferably less than 100,000 so that it may be formed into a thin film less than 0.2 mm thick in cross-section. The concentration of α-Al in the dope is at least 1% by weight of the film and no more than 50% by wt. Preferably the α-Al particles are present in the dope in an amount in the range from 0.25 to 10 parts per 100 parts by weight of the combined weight of PVDF, hydrophilic polymer and particles; and, most preferably, in a dope containing the complex, the components of the dope are present in amounts in the following ranges set forth in Table 2 below, the remaining parts being a solvent for PVDF, for example, NMP:

TABLE 2

| Component | Amount, parts by wt/100 parts by wt of dope |
|---|---|
| PVDF | 10 to 25 |
| α-Al | 0.5 to 5 |
| Hydrophilic polymer | 0.5 to 5 |

In addition the dope may contain less than 1 part by weight of surfactants and processing aids suitable for use as dispersants and compatibilizers in the non-aqueous solvent used. The surfactant used may be amphoteric, anionic or cationic, so long as the surfactant and/or processing aid dissolves in NMP and is stable at the temperature at which the dope is extruded or cast. Solvents most commonly used for PVDF include NMP, N,N-dimethylacetamide, N,N-diethylacetarnide, dimethyl formamide (DMF), diethyl formamide (DEF), tetrahydrofuran (THF), tetramethyl urea and dimethyl sulfoxide (DMSO).

It is necessary to mix the hydrophilic polymer containing acid into the PVDF/α-Al complex so that a grafted copolymer is formed. As mentioned earlier when PVDF is added to the suspension of α-Al in NMP, PVDF dissolves and a color change is observed. However if the acid-containing hydrophilic polymer is added to the suspension of α-Al in NMP to form a mixture, and PVDF is then added to this mixture, no color change is observed. Reason for this is that the acid in the hydrophilic polymer neutralizes the base generated by the α-Al and no dehydrofluorination occurs. The membrane made from a dope made with neutralized α-Al is weak and unusable though it has good flux and rejection. The order of addition of the components is therefore critical. Preferred is 40–90% hydrolyzed polyvinyl acetate, more preferably from 40% –70% hydrolyzed. When a dope is made with powdered neutral α-Al or powdered zirconia instead of calcined α-Al, no color change is observed indicating there is no dehydrofluorination. The hydrophilic polymer used is not narrowly critical so long as it has a hydroxy or other nucleophilic group present, which could react with the intermediate formed to yield a graft polymer. Useful such polymers include, polymers containing carboxylic acid groups (acrylic, methacrylic acid), glycols (polyethylene glycol), sulfonated (polysulfone or polyethersulfone), or lactams (polyvinyl pyrrolidones) functionalities and cellulose acetate and their derivatives. Concentration of hydrophilic component is preferably in the range from 0.5 to 5 parts by weight, per 100 parts of dope.

The tubular braid has a central longitudinal bore and is preferably made from "ends" which are knitted or woven to form the tubular braid having a formations circumferential outer surface interrupted by a multiplicity of overlapping yarns contiguously woven into the tubular braid. The bore of the braid has a nominal inside diameter in the range from about 0.25 mm to 2.3 mm. The woven or knit braid has a wall thickness from about 0.06 mm to about 0.7 mm, preferably being in the range from 0.15–0.23 mm. The diameter of the filaments of the ends, and the way the ends are knitted or woven with from about 20 to 100 picks/25.4 mm, preferably from 35–50 picks/25.4 mm, result in a braid of arbitrary length which is highly flexible and ideally "flaccid". The outside diameter of the braid ranges from about 0.6 mm to 2.5 mm. The voids in the braid are non-uniformly shaped by the braided yarn or "carriers", the voids being small enough to inhibit substantial penetration of a dope from which the film membrane is formed. The upper portion of the tubular braid provides a continuous support for the film, preferably, without the braid being embedded in the film.

Surfactants include Triton, a long chain fatty acid ester of an aminoalcohol; or, Tamol 731, a sodium salt of a polymeric carboxylic acid, available from Rohm & Haas Co.; sulfonated polysulfone, polyhydroxy alcohol hydrophilic additives, and the like. A suitable surface active agent for use in an aqueous liquid is Darvan C, an ammonium salt of a carboxylated liquid polyelectrolyte available from the R.T. Vanderbilt Company.

The dope preferably has a viscosity in the range from about 8,000 cp to about 120,000 cp at 22° C., the viscosity being chosen according to the thickness of the film to be deposited, whether for MF or UF, and the adherent characteristics of the dope and the material from which the ends are spun. For MF, the viscosity is preferably in the range from about 8,000 to about 50,000 cp; and for UF, the viscosity is preferably >50,000, in the range from about 50,000 to about 120,000 cp.

Details of the method for producing a braided semipermeable hollow fiber membrane are well known to those skilled in the art and are found, for example, in U.S Pat. No. 5,472,607 to Mahendran et al.

Figure 2:
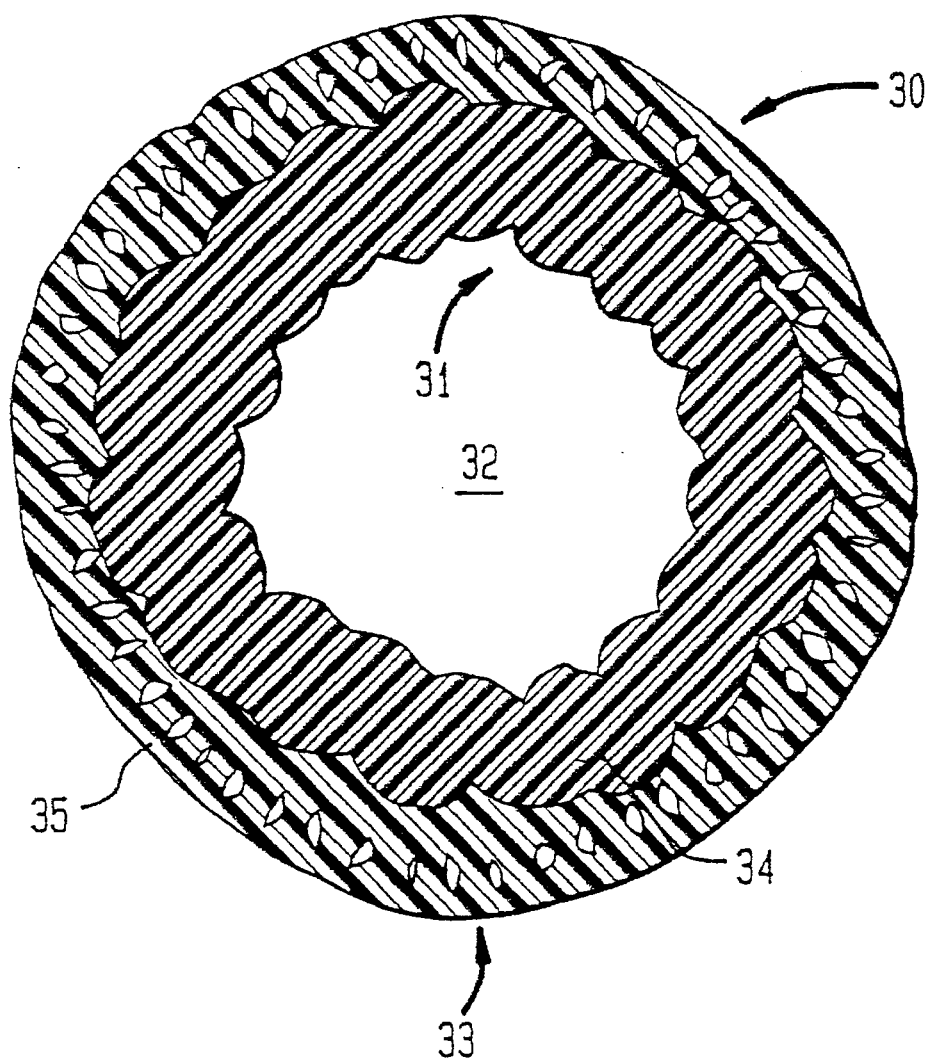
FIG. 2 is a cross-sectional end view of a hollow fiber membrane formed on a tubular braid, schematically illustrating the radially disposed annular zones which extend longitudinally axially over the length of the membrane, and showing how the tubular non-self-supporting film is supported on the braid, preferably without being embedded therein so as not to impregnate the wall of the braid completely.

Referring to FIG. 2 there is shown in a diametrical cross-sectional view, much enlarged, of a tubular braid indicated generally be reference numeral 30 comprising a braid of woven yarn 31 having a "lumen" (inner bore) 32. A thin film membrane, indicated generally by reference numeral 33, is self-adherently secured to the circumferential outer surface 34 which is rough and uneven because it is formed by the interwoven yarn which, in the range of thickness used and the number of picks in which it is woven, does not result in an even surface.

Figure 3:
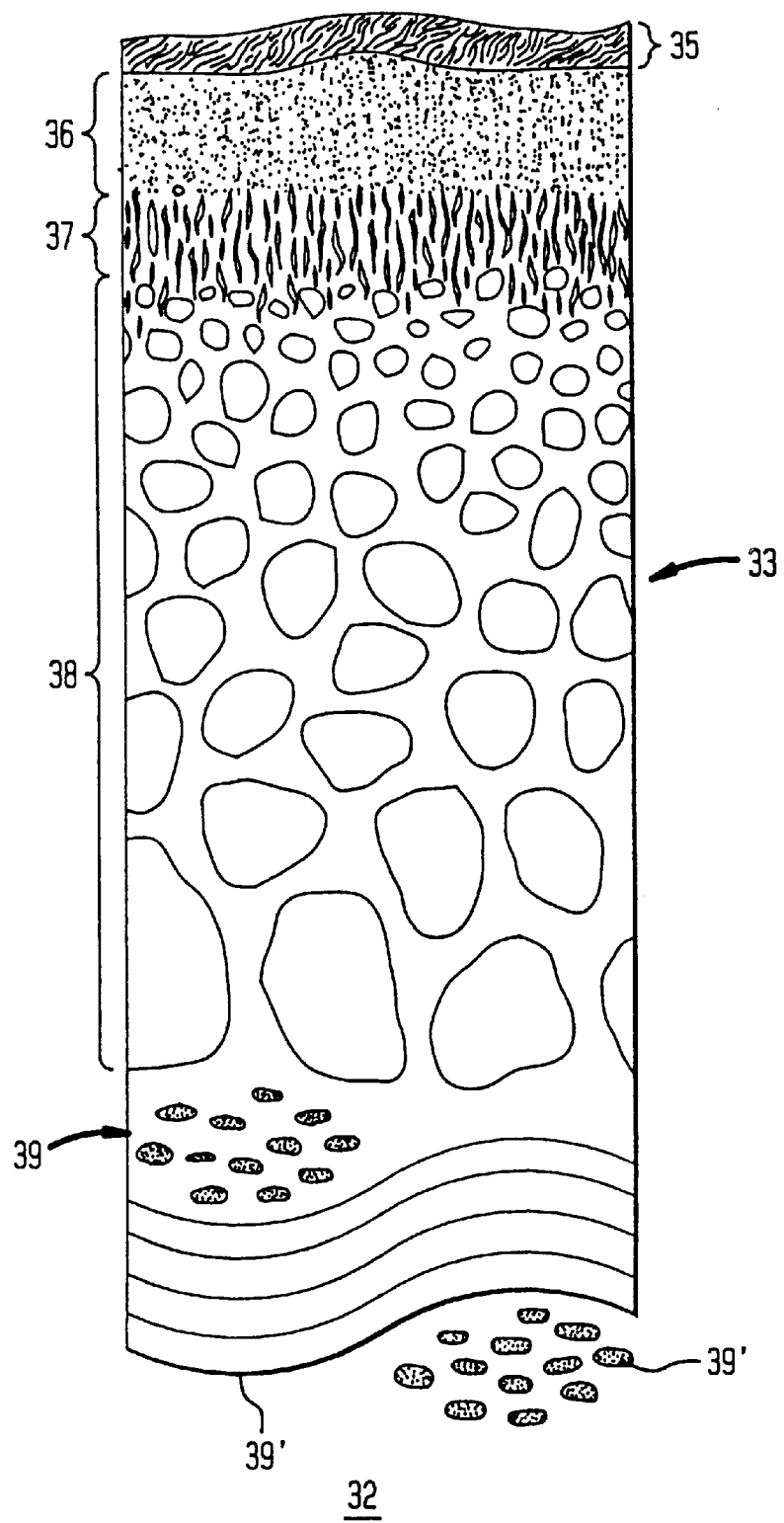
FIG. 3 is an illustrative cross-sectional view of the film on the braided tubular membrane, showing greatly enlarged dimensions, to illustrate the dimensional relationships of pores in the component layers of the braid-supported membrane which relationships make the membrane so effective for MF and UF.
Figure 4:
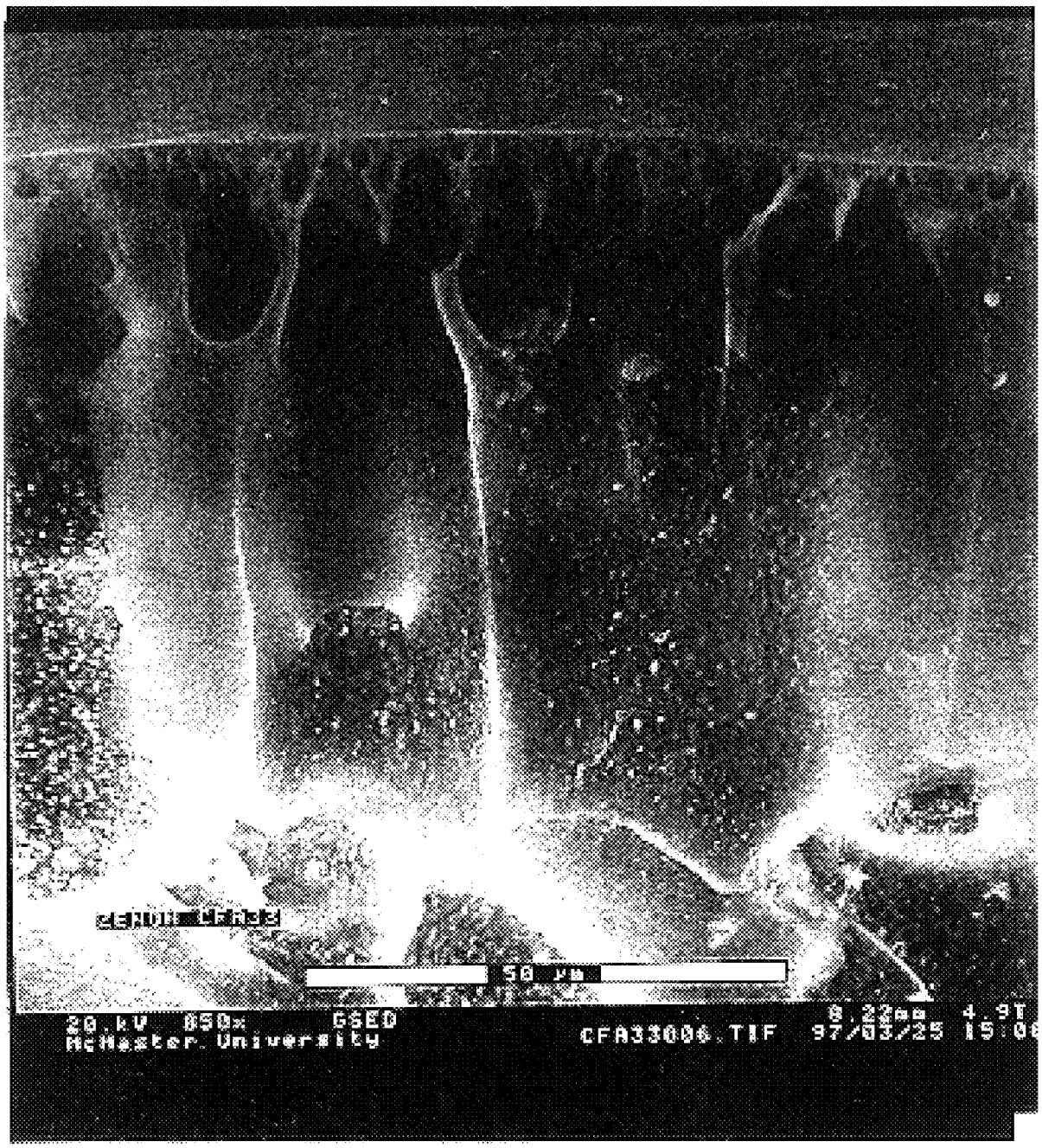
FIG. 4 is a photomicrograph of a cross section of PVDF/α-Al/HPVA MF film, showing a structure corresponding to that illustrated in FIG. 3. The components of the film are present in the ratio 15/1/1 respectively (6% α-Al % by wt of the film), the scale corresponding to 50 μm indicating a relatively low magnification.

Referring to FIG. 3 there is schematically illustrated, greatly enlarged relative to FIG. 2, the asymmetric thin film membrane 33, which when formed by being coagulated, is itself striated into an overlying ultrathin barrier layer of "skin" 35 and three distinctly identifiable layers of pores, an outer layer 36, an inner layer 38 and an intermediate transport layer 37 between outer layer 36 and inner layer 38, as evident in great detail in the photomicrograph FIG. 4. The skin is a very thin, dense layer of polymer formed as the dope contacts the coagulant. By reason of the manner in which the skin and each layer is formed from the same polymer, the layers have, in a radially inward direction from under the skin to the braided yarn 39 which defines the bore 32, progressively larger pores. Each yarn or "end" 39 consists of a multiplicity of filaments 39', and the circumferential surface of the interwoven strands of yarn does not provide a smoothly cylindrical surface. The skin is generally thinner and the pores for a MF membrane are larger than those of a UF membrane made from the same polymer.

The α-Al particles dispersed in the polymeric film are evident in the photomicrograph of FIG. 4 showing primary particles dispersed in the film. The particles are white dots (because they are far more reflective than the polymer). The shaped grey areas represent polymer which defines the voids, seen as dark areas because they are least reflective. Even at relatively low magnification (the entire white bar, within which the black bar bears the numerically defined dimension, represents 50 μm), the relationship of the skin, the inner and outer layers under the skin, and the distribution of the pores is clearly evident. Individual particles in the range from about 1 μm to 2 μm are readily visible though much smaller than the large voids in the inner layer 38 of the film. Larger and smaller particles are identified by reference numerals 41 and 42 respectively. The film photographed was made by coating a braid with dope which was quenched in water at 47° C. The membrane yields a permeability of 23 GFD/psi (US gals/square foot/pounds per square inch). The preferred temperature range for quenching is from 6° C. to 90° C., more preferably from 30° C. to 50° C.

Figure 5:
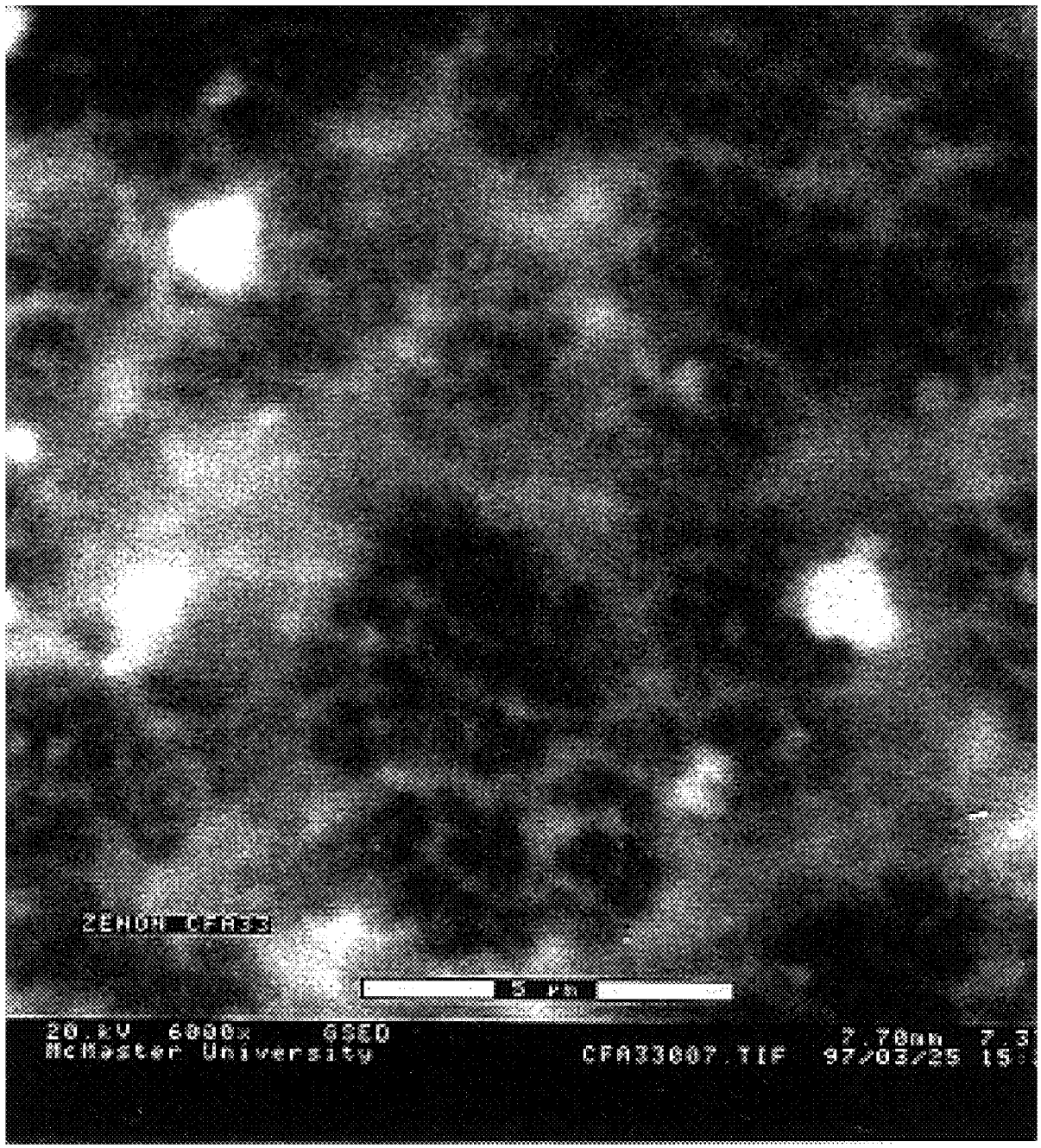
FIG. 5 is a photomicrograph taken from directly above the outer circumferential surface of a PVDF/α-Al/HPVA MF film on a woven braid support, showing the scale corresponding to 5 μm, indicating a magnification about 7.5× higher than that used in FIG. 4.

Referring now to FIG. 5 there is shown a higher magnification photomicrograph of the outer surface. The dense skin is so thin it is essentially transparent. Large primary particles 41 (about 2 μm) and smaller particles 42 are seen as white spots spaced-apart by polymer. The dark spots are voids in the film, the voids appearing substantially circular because they are viewed from above. Such spaced-apart relationship of individual primary particles is possible because of the low concentration of particles, preferably no more than 10% by weight of the film. By varying the ratio of the components in the dope and the conditions under which it is coated on a support, a preferred MF membrane may be formed having pores in the narrow size range from about 0.1 μm to 0.3 μm. A preferred UF membrane may be formed having pores in the narrow size range from about 0.05 μm to 0.1 μm.

MF membranes made with dope containing PVDF/α-Al/HPVA wherein PVDF ranges from 13 to 18 parts by wt, α-Al ranges from 1 to 5 parts and HPVA ranges from 1 to 2 parts, the remaining being NMP, have pores with a mean diam. in the range from about 0.1 μm to about 0.16 μm; a 200K molecular weight cut-off (MWCO 200K) in the range from about 80% to 95%; and, a permeability in the range from 30–80 GFD/psi at 5 psi.

The measured skin thickness (by electron microscopy) for particular films made for the braided membrane, is given below to appreciate its thickness in relation to the pores of the layers. The approximate ranges of sizes of the pores for preferred MF and UF membranes are given below:

TABLE 3

| Thickness | MF, μm | UF, μm |
| --- | --- | --- |
| Skin 35 | 0.1–1.5 | 1–4 |
| Outer layer 36* | 0.5–1.0 | 0.5–2 |
| Intermediate transport layer 37* | 2–6 | 5–10 |
| Inner layer 38* | 10–40 | 10–150 |

*average pore diameter

The approximate thickness of each layer in a MF and UF braided membrane are given in the following Table 4.

TABLE 4

| Thickness, average | MF, μm | UF, μm |
| --- | --- | --- |
| Skin 35, | 0.1–1.5 | 1–4 |
| Outer layer 36 | 5–10 | 20–40 |
| Intermediate transport layer 37 | 30–50 | 40–80 |
| Inner layer 38 | 100–1000 | 100–1000 |

The foregoing illustrative values extend not only to flaccid or flexible supports but also to relatively rigid supports, e.g. braid made of carbon fiber. "Ends" range in nom. dia. from about 0.05 mm to 0.5 mm, preferably 0.165 mm–0.302 mm.

The unexpected smoothness of the novel membrane is evident in images of the surfaces of various PVDF membranes with an Atomic Force Microscope. The images in color do not lend themselves to reproduction in black and white print, and are therefore not included herein, but the measurements of roughness are given for the membranes identified in the following Table 5. The same PVDF homopolymer is used for the preparation of each membrane.

TABLE 5

| Membrane | Rq (nm) | Ra (nm) | Rmax (nm) |
| --- | --- | --- | --- |
| PVDF[1] | 7.643 | 6.134 | 43.58 |
| PVDF/α-Al[2] | 5.017 | 3.975 | 28.709 |
| PVDF/HPVA | 15.923 | 12.26 | 132.11 |
| PVDF/α-Al/HPVA[3] | 10.667 | 8.469 | 63.026 |

[1]homopolymer number avg mol wt 30,000
[2]ratio of PVDF/α-Al is 15/2
[3]ratio of PVDF/α-Al/HPVA is 15/2/1

Figure 6:
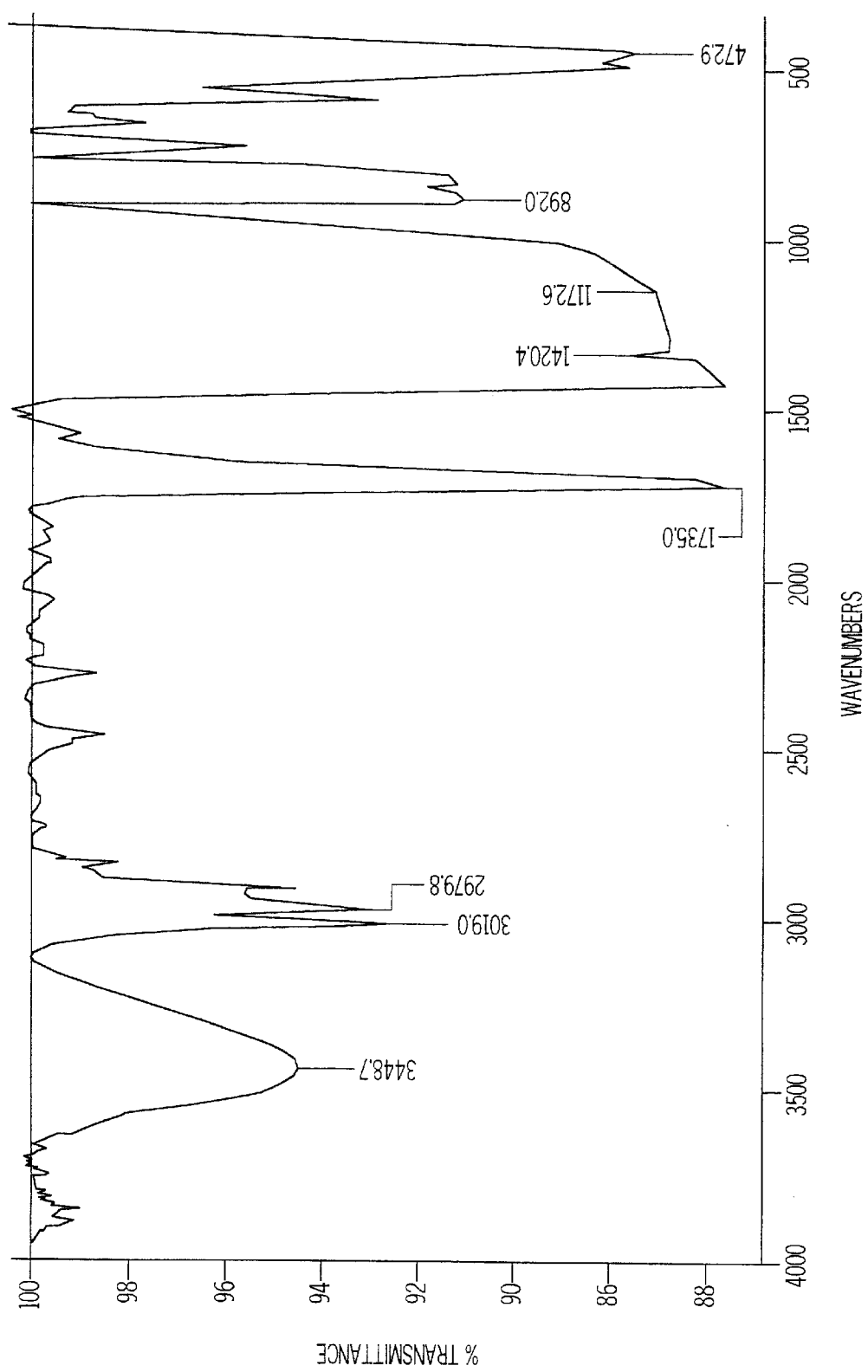
FIG. 6 is an infrared (IR) spectra of a prior art PVDF/HPVA blend containing no calcined (α-Al) particles, before being treated with sodium hypochlorite (NaOCl) solution.

Referring to the IR spectra of a PVDF/HPVA membrane before being treated with NaOCl, shown in FIG. 6, a large peak attributable to the HPVA at 1722–1735 $cm^{-1}$ is clearly present.

Figure 7:
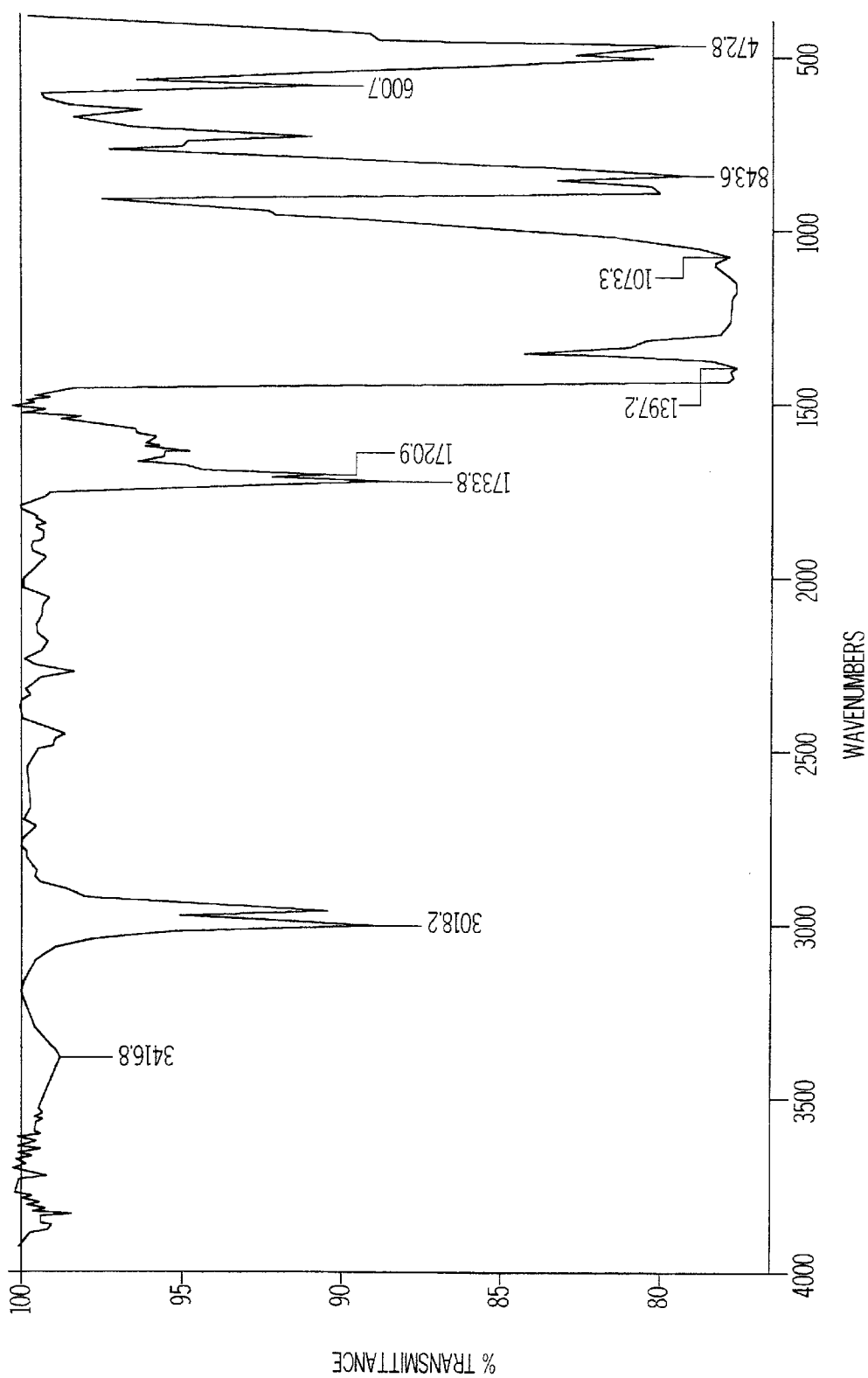
FIG. 7 is an infrared (IR) spectra of the same prior art PVDF/HPVA blend of FIG. 6, after being treated with NaOCl solution.

Referring to the IR spectra shown in FIG. 7, of the same PVDF/HPVA membrane used to obtain the spectra of FIG. 6, but after the membrane is treated with NaOCl, the peak attributable to the hydrolyzed vinyl acetate at 1722–1735 $cm^{-1}$ is greatly diminished. It is evident that the hydrolyzed vinyl acetate is highly susceptible to attach by the NaOCl at the concentration of NaOCl (2000 ppm) used.

Figure 8:
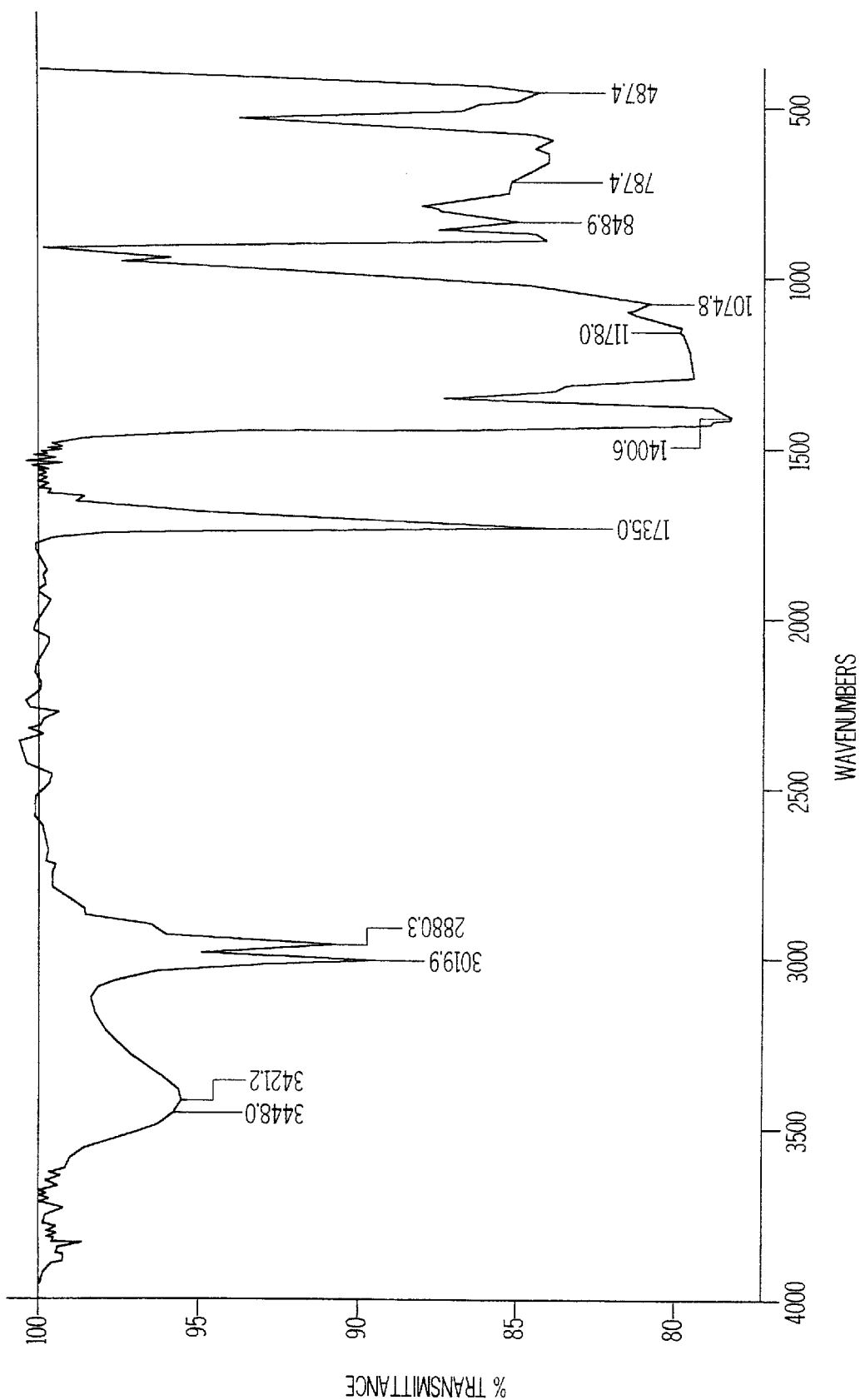
FIG. 8 is an infrared (IR) spectra of a PVDF/α-Al/HPVA membrane containing calcined α-alumina (α-Al) particles, before being treated with NaOCl solution.

Referring now to the IR spectra of a PVDF/α-Al/ hydrolyzed vinyl acetate membrane before being treated with NaOCl, shown in FIG. 8, the large peak attributable to the hydrolyzed vinyl acetate at 1735 is again clearly present.

Figure 9:
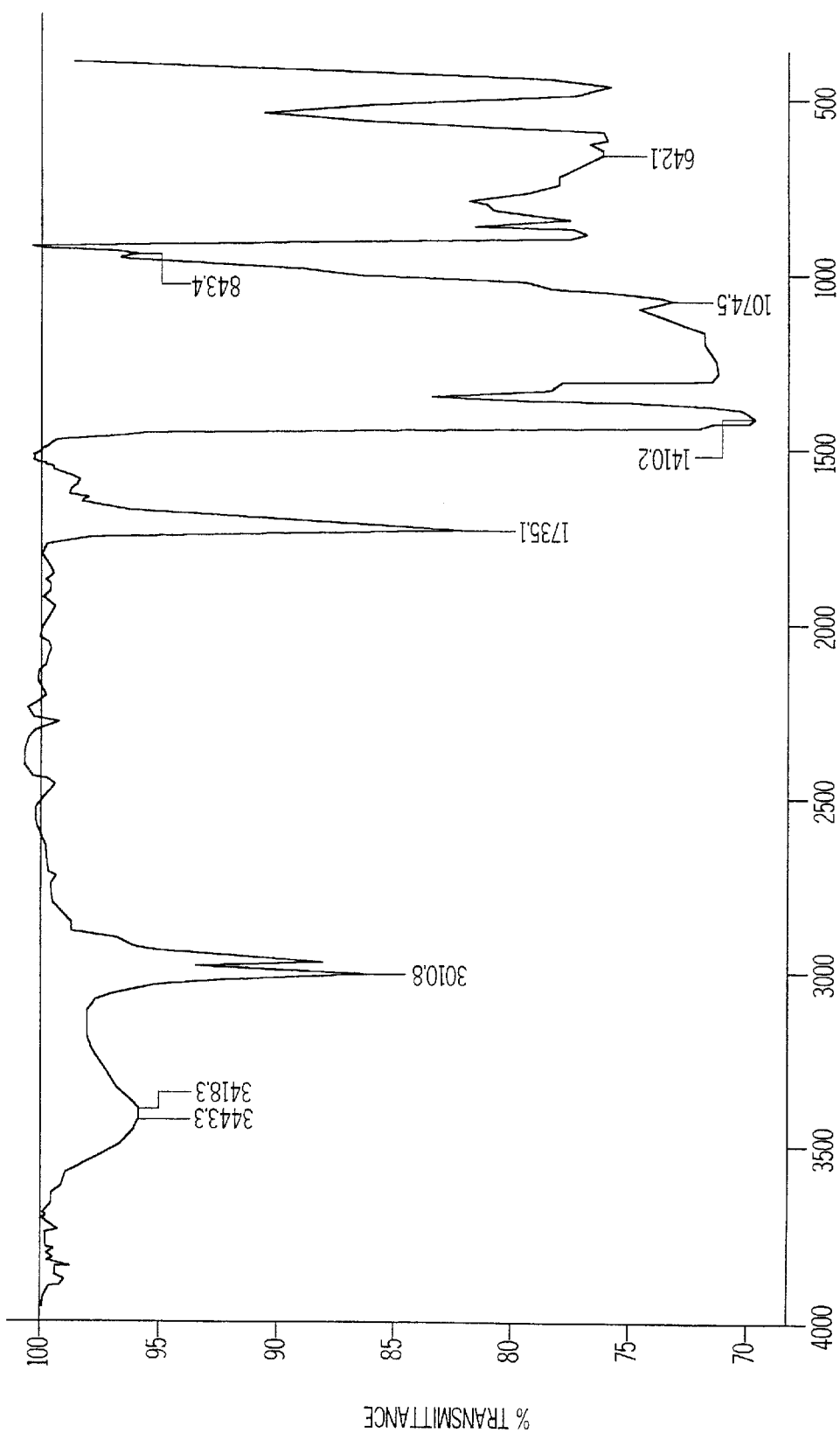
FIG. 9 is an infrared (IR) spectra of the same PVDF/calcined α-Al/Hydrolyzed polyvinyl acetate membrane of FIG. 7, after being treated with NaOCl solution.

Referring to the IR spectra shown in FIG. 9, of the same PVDF/α-Al/HPVA membrane used to obtain the spectra of FIG. 8, but after the membrane is treated with NaOCl, the peak attributable to the hydrolyzed vinyl acetate at 1735 $cm^{-1}$ is essentially undiminished relative to the peak at 1735 $cm^{-1}$ in FIG. 8. It is evident that the hydrolyzed vinyl acetate is essentially unattacked by the NaOCl, which can only be the result of grafting of hydrolyzed vinyl acetate to PVDF.

Figure 10:
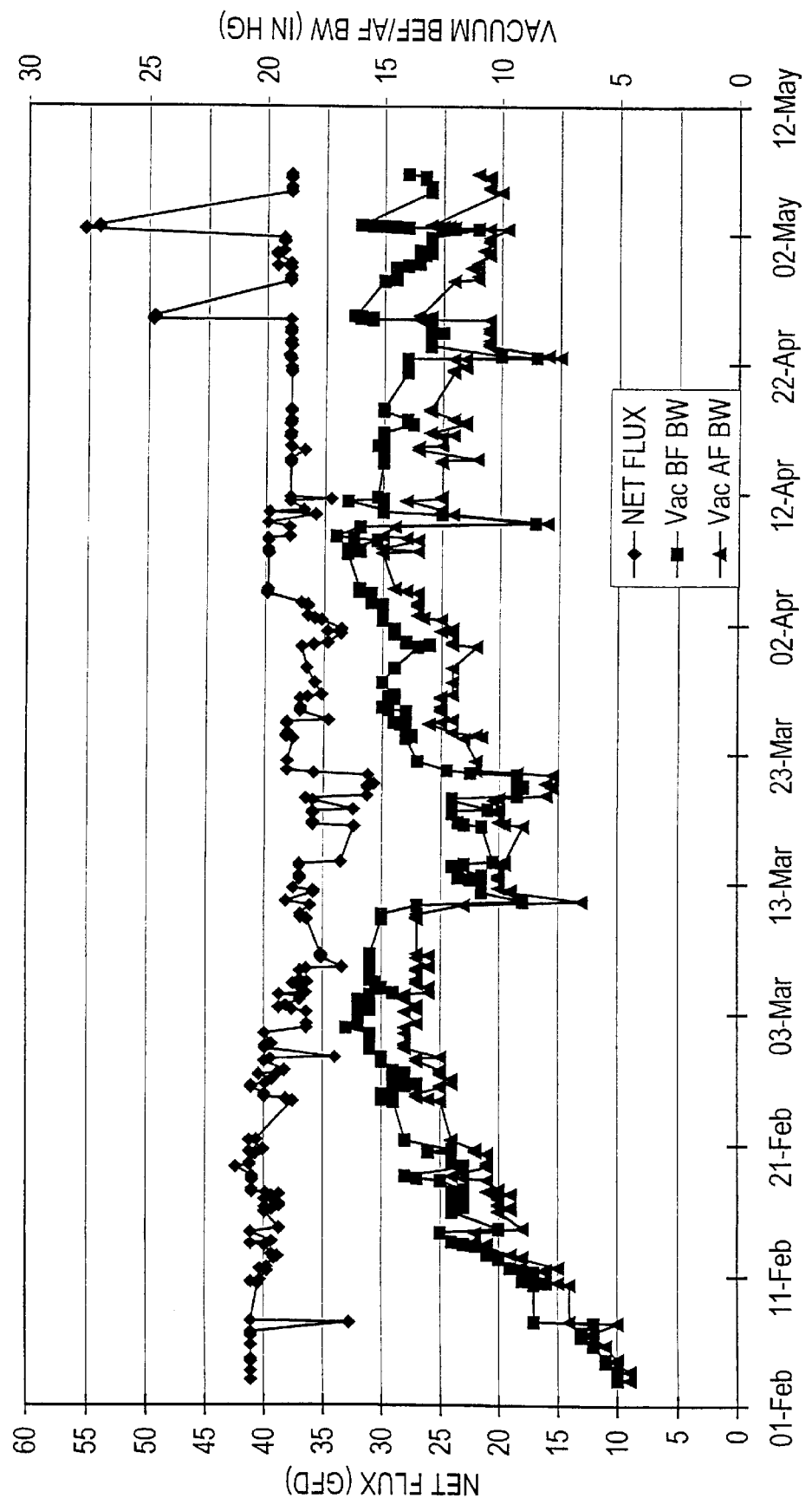
FIG. 10 is a graph showing the net flux of the novel calcined α-Al-containing membrane(11% α-Al by wt) in microfiltration of Lake Ontario water.

Referring to FIG. 10 there is shown a plot of Net Flux (GFD) against vacuum before and after backwashing a vertical skein of braided membranes, as a function of time, using PVDF/α-Al/HPVA (15/2/1) fiber membranes with a total of 150 ft² surface, under conditions which provide a net flux of 40 GFD. At the commencement of the test, the fresh membranes produce 40 GFD at a vacuum of about 4 inches of mercury (4" Hg). At intervals indicated, the net flux is maintained at 40 GFD and the vacuum is read just before backwashing. The membranes are then backwashed, and the vacuum read again. It is seen that, except for a sudden drop in net flux on the 3rd day, a progressively greater vacuum is required to maintain the net flux of 40 GFD until the required vacuum stabilizes after about the eleventh day, indicating the membranes are operating at equilibrium. From experience we find that the net flux obtained with the novel membranes operating in relatively clean water is at least 50 percent higher than that obtained with the prior art PVDF/HPVA membranes operating under identical conditions. This improvement in flux is confirmed even in "dirty" water as is indicated in FIG. 10.

Figure 11:
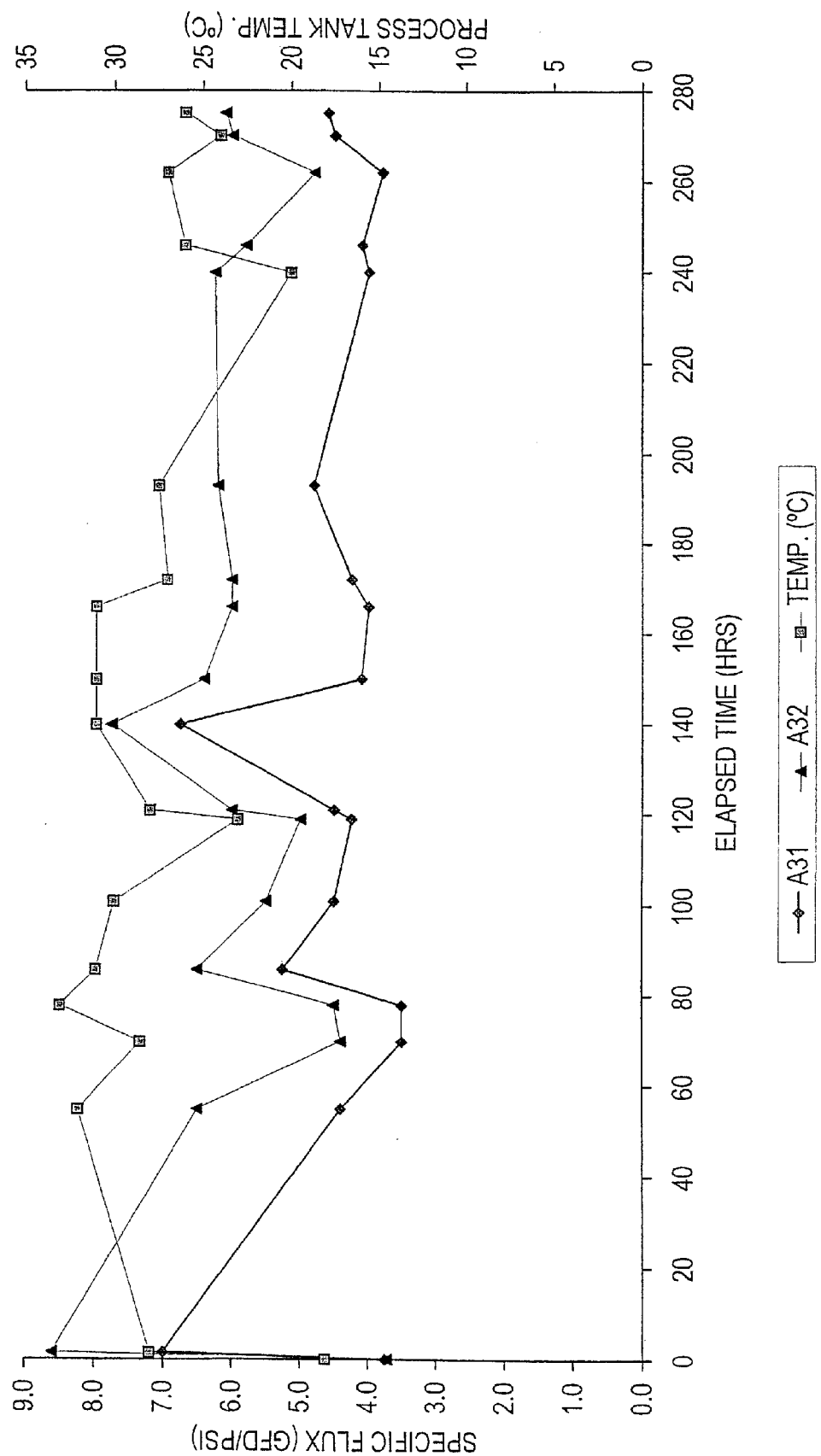
FIG. 11 is a graph showing the performance of PVDF/α-Al/HPVA membrane in a direct comparison with a prior art PVDF/HPVA membrane.

Referring to FIG. 11 there is plotted the comparative performance of a vertical skein of prior art PVDF/HPVA braided membranes (identified as A31) against PVDF/α-Al/HPVA membranes (identified as A32), each with 500 ft² area, operating in Burlington municipal sludge. The specific flux (GFD/psi) is plotted against time indicating also the temperature at which each reading was recorded. The initial clean water specific flux for the A31 membranes is 20 GFD/psi at 25° C.; and for the A32 membranes the specific flux is 36.6 GFD/psi. The plot for the A32/CFA membranes indicates a consistently better specific flux (about 50% better) than that for the A31-MF-200-1 membranes at the same temperature.

The following illustrative examples may be readily practiced by one skilled in the art and are provided to demonstrate how the preferred braided hollow fiber membrane is made, and how it is used in MF and UF applications.

EXAMPLE 1

Making a Representative Dope having the Following Essential Components (Given in Parts Per Hundred Parts By Weight of Dope)

| | |
|---|---|
| N-methyl-2-pyrrolidone (NMP) | 82 parts |
| polyvinylidene fluoride (PVDF) | 15 parts |
| calcined α-alumina particles ("α-Al") | 2 parts |
| 50% hydrolyzed polyvinyl acetate (HPVA) | 1 parts |
| Total | 100 parts |

70 gm of calcined α-Al particles having an average primary particle size of about 0.4 $\mu$m are weighted in a flask to which 2787 gm of NMP is added and thoroughly mixed in a Sonicator® for at least 1.5 hr, to ensure that agglomerates of primary particles are broken up so as to form a suspension in which individual primary particles are maintained in spaced apart relationship with each other in the NMP. The suspension is milky white, the white color being contributed by the white calcined α-Al. To this suspension is slowly added 525 gm of PVDF having a number average mol wt of about 30,000 Daltons while stirring at high speed until addition of the PVDF is complete. During the addition of the PVDF the milky white color of the suspension changes first to pink, then to yellowish brown, at the end to grey/brown. Since PVDF dissolved in NMP produces no color change, and the milky white color of the suspension is attributable to the α-Al particles, the changes in color provide evidence of a reaction between the calcined α-Al or a base present in the calcined alumina.

When the grey/brown color of the NMP/PVDF/α-Al complex in suspension is stable and does not change upon standing for a sustained period in the range from 4 hr to 24 hr, 118 gm of a 30% solution of 50% HPVA containing 1.6–1.7% sulfuric acid in NMP is added to form a dope which is stirred overnight. The dope is then degassed either by letting it stand for 24 hr, or by centrifuging it. The viscosity of the degassed dope is about 14,500 centipoise (cp).

EXAMPLE 2

Making the Hollow Fiber Membrane of Tubular Braid—a MF Membrane

The dope formed in Example 1 is fed to a nozzle through which a tubular braid of polyester fibers is advanced at about 12.2 meters/min (40 ft/min). The nozzle has a bore with a nominal inner diameter of 1.5 mm. The rate of flow of solution to the nozzle is adjusted so that the solution is flowed upon and around the periphery of the braid at a pressure of 274 kPa (25 psig) over a coating distance of 3 mm (0.125 inch). The braid, coated with the solution is then pulled through a sizing die having a diameter of 2.15 mm, then led into a coagulation tank where the polymer solution is coagulated in water to afford a semipermeable membrane about 0.1 mm thick, supported on the tubular braid which assumes an essentially circular cross-section. This coated braid was then quenched by immersion in sequential first and second coagulation baths of water, each at 47° C. (116° F.). The braided membrane has an essentially circular bore having an i.d. of 0.9 mm and an o.d. of 1.85 mm. It is taken up onto the reel of a winder. In tests, it is found that the braided MF membrane provides excellent results.

After a section of the braided membrane was washed overnight in cold water, its water permeability is determined by measuring its flux which is found to be 6 LMH/kPa (liters per meter$^2$ per hr per kPa) or, permeability of 25 GFD/psi measured at 5 psi. After another section of the braided membrane, it is treated with an aqueous solution containing 2000 ppm of sodium hypochlorite (NaOCl). Water permeability of the NaOCl-treated membrane was found to be 12 LMH/kPa measured at 35 kPa (50 GFD/psi measured at 5 psi). In each case, the pore size measurements and molecular weight cut-off measurements provide evidence that the pores in the film are suitable for microfiltration.

A photograph of a cross-section of the braided MF membrane, made with an electron microscope, shows the film membrane overlying the braid to be about 0.05 mm thick. The thickness of the skin 35, and each individual layer 36–38 will depend upon the conditions under which the film is made. Measurements made in a vertical plane through the circumference, across the wall of the film, provides the following data on pore sizes:

| Section | 5$\mu$m |
|---|---|
| Skin thickness | 0.8 |
| Outer layer 36* | 0.781 |
| Intermediate layer 37* | 1.5 |
| Inner layer 38* | 14–32 |

*average pore size

The braided membrane was used to form a MF filtration module having a vertical skein construction described in Ser. No. 08/514,119. The water flux measured under 34.45 kPa (5 psi suction pressure) and 25° C. is found to be 510 LMH (300 GFD).

EXAMPLE 3

A dope of PVDF/α-Al/HPVA in NMP use hereabove, except having a viscosity of 94,500 cps is fed to a nozzle through which a tubular braid having a bore with a nominal i.d. of 0.9 mm and o.d of 1.6 mm is advanced. As before, the flow of dope is adjusted so that the solution is flowed upon and around the periphery of the braid over a coating distance of 3 mm (0.125 inch). The braid, coated with the solution is then pulled through a sizing die having a diameter of 2.15 mm, then led into a coagulation tank where the polymer solution is coagulated in water to afford a thin semipermeable membrane 0.075 mm thick supported on the braid. The braided UF membrane has an essentially circular bore with an i.d. of 0.9 mm and an o.d. of 1.75 mm. It is taken up onto the reel of a winder. This membrane had a mean pore size of 0.076 $\mu$m. A portion of this membrane was tested on pure water, had a permeability of 34 LMH/6.89 kPa (20 GFD/psi).

EXAMPLE 4

Microfiltration of Contents of an Activated Sludge Bioreactor

The pressure on the outer surface of braided membranes in a module constructed as described above is 35 kPa (5 psig). The temperature of the feed is 35° C. and the feed contains 35,000 mg/L of suspended solids including live cells predominantly of Pseudomonas bacteria in the size range from 1 μm long and 0.5 μm in nominal diameter. The stable flux obtained is in the range from 25–30 LMH.

Having thus provided a general discussion, described the overall process in detail and illustrated the invention with specific examples of the best mode of making the supported membrane, and purifying water with a skein containing the membranes, it will be evident that the invention has provided a surprisingly effective solution despite the teachings of the art. It is therefore to be understood that, no undue restrictions are to be imposed on the scope of this invention by reason of the specific embodiments illustrated and discussed, and, particularly that the invention is not to be restricted to a slavish adherence to the details set forth herein.

We claim:

1. A dope for making a filtration membrane, said dope being produced from a complex of calcined α-alumina particles and polyvinylidene difluoride (PVDF) in a solvent for said PVDF, said complex being formed by dispersing at least 1 part by weight, but less than 50 parts by weight of said particles per 100 parts by weight of said particles and PVDF, in a solvent for said PVDF, said particles having a primary particle size in the range from about 0.1 μm to about 5 μm, said complex being reacted with a hydrophilic polymer which is added to the dope in a minor amount by weight relative to said PVDF, said hydrophilic polymer having reactive nucleophilic groups adapted to react with said complex and impart hydrophilicity to said membrane.

2. A method for making a dope to be used to make a filtration membrane, said method comprising, preparing a complex consisting essentially of calcined α-alumina particles in a solvent for polyvinylidene difluoride (PVDF), said complex being formed by dispersing less than 50 parts by weight of said particles per 100 parts by weight of said particles and PVDF, in a solvent for said PVDF, said particles having a primary particle size in the range from about 0.1 μm to 5 μm;

adding a hydrophilic polymer in a minor amount by weight relative to said PVDF said hydrophilic polymer having reactive nucleophilic groups adapted to react with said complex and impart hydrophilicity to a film formed from said dope;

said dope having a viscosity sufficient to provide a continuous coating on a support, said particles being present in said dope in an amount at least 1 percent by weight of the combined weight of said PVDF, said hydrophilic polymer and said particles.

3. The method of claim 2 wherein said dope has a viscosity in the range from about 8,000 cp to about 50,000 cp at 22° C. for a microfiltration membrane and said particles are present in an amount less than 15 percent by weight of said combined weight.

4. The method of claim 2 wherein said dope has a viscosity in the range from about 50,000 cp to about 120,000 cp at 22° C. for an ultrafiltration membrane and said particles are present in an amount less than 20 percent by weight of said combined weight.

5. A filtration membrane made from the dope produced in claim 2.

* * * * *